Sept. 25, 1945.   O. E. MAHAFFEY   2,385,716
GUY LINE EQUIPMENT FOR TENTS
Filed April 24, 1944   2 Sheets-Sheet 1

Inventor
Owen E. Mahaffey

By Clarence A. O'Brien
and Harvey B. Jackson
Attorneys

Sept. 25, 1945. O. E. MAHAFFEY 2,385,716
GUY LINE EQUIPMENT FOR TENTS
Filed April 24, 1944 2 Sheets-Sheet 2
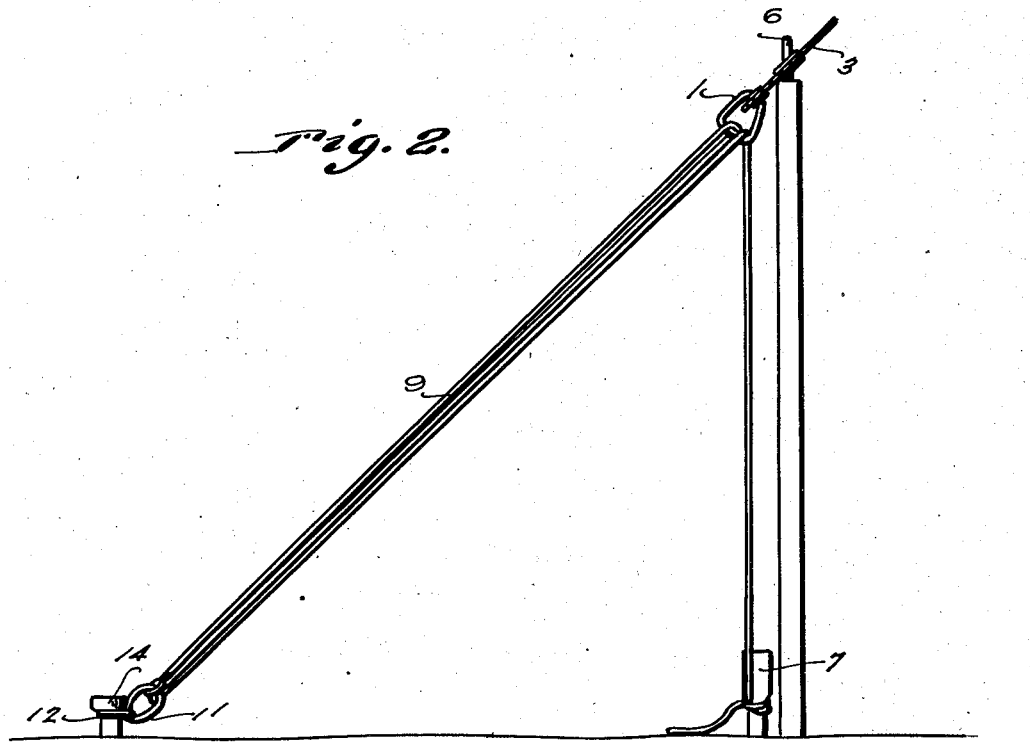
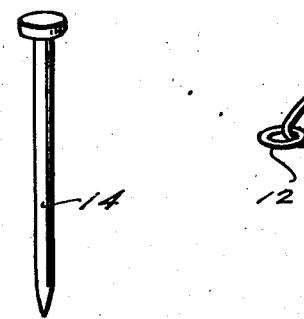
Inventor
Owen E. Mahaffey
By Clarence A. O'Brien
and Harvey B. Jacobson
Attorneys Patented Sept. 25, 1945

2,385,716

UNITED STATES PATENT OFFICE 2,385,716

GUY LINE EQUIPMENT FOR TENTS

Owen E. Mahaffey, Memphis, Tenn.

Application April 24, 1944, Serial No. 532,495

1 Claim. (Cl. 135—15)

My invention relates to improvements in guy line equipment for tents, the principal object in view being to provide equipment of the character specified which is particularly adapted for pulling a tent top taut with a minimum of time and labor and without the use of block and tackle, and which involves few parts and is inexpensive to manufacture.

Other and subordinate objects are also comprehended by my invention, all of which, together with the precise nature of my improvements, will be readily understood when the succeeding description and claim are read with reference to the drawings accompanying and forming part of this specification.

Figure 1:
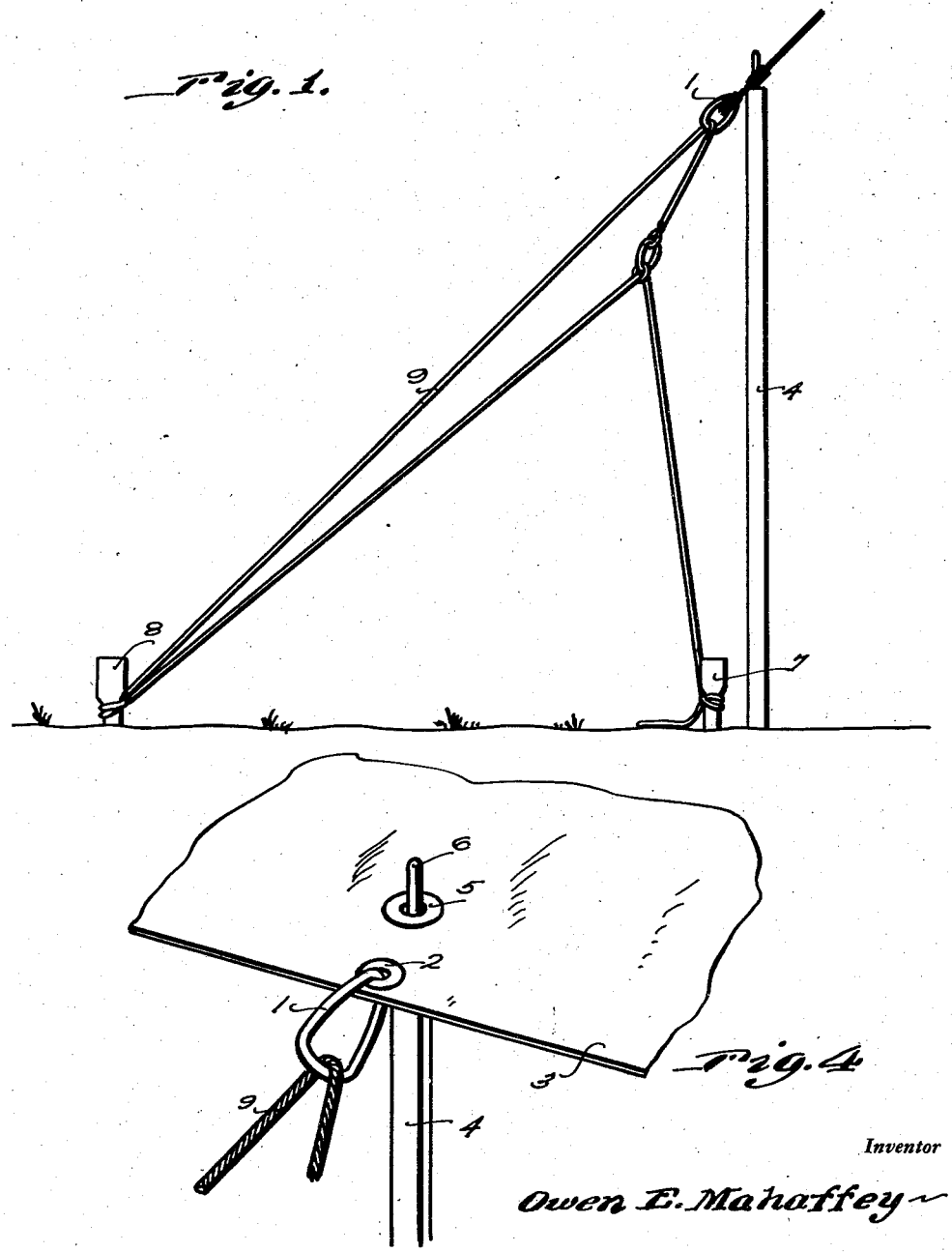
Figure 4:
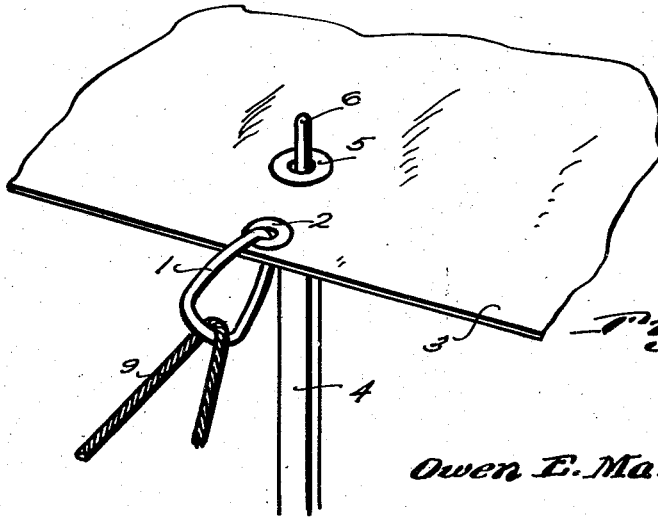

In said drawings:

Figure 1 is a view in side elevation of my improved guy line equipment in its preferred embodiment, Figure 2 is a similar view of a modification of the invention, Figure 3 is a view in perspective of the shackle end of the line, Figure 4 is a view in perspective illustrating the manner in which the thimble link is attached to the tent top, and Figure 5 is a view of one of the stakes.

Referring to the drawings by numerals, according to my invention, in its preferred embodiment, and as best illustrated in Figure 1, a thimble link 1 is attached by a grommet 2 to the edge of the tent top 3 which is attached to the upper end of the usual side pole 4 in the conventional manner, as by a grommet 5 in said top placed over the peg 6 on said pole. A pair of anchor stakes 7, 8, preferably of wood, are provided, one close to the pole 4 and the other spaced suitably from the first one in substantially a common plane with the first-mentioned stake and the pole 4. The top is attached to said stakes 7, 8 and drawn taut by means of a guy line 9, having a shackle 10 on one end thereof in the form of a pair of relatively large and small links 11, 12, the line being eye spliced, as at 13, to the larger links 11. The guy line 9 is attached intermediate its ends to the stake 8, preferably by two wraps and a clove hitch, and with one stretch having the shackle 10 passed through the thimble 1 for a short distance beyond said thimble. The other stretch of the guy line 9 is rove through the smaller link 12 of the shackle 10, the line pulled taut to said shackle, and then pulled down to the stake 7 and fastened thereto by a clove hitch or the like.

In the modified embodiment of the invention illustrated in Figure 2, a metal stake 14 is used in lieu of stake 8 and the shackle end of guy line 9 attached to said stake 14 by driving the stake through the small link 12 of the shackle. The line 9 is then run through the thimble 1 and back through the large link 11 of shackle 10, then back through the thimble 1, then pulled taut, and fastened to the stake 7 by a clove hitch.

In either of the described embodiments of my invention, maximum leverage may be attained against the tent top 3 with a minimum of effort, in the case of the modified embodiment a double leverage, as will be clear. Therefore, the tent top may be stretched or rendered taut and pulled outwardly of the pole 4 so as to relieve the latter of all strain. Incidentally, it is not necessary to slant the pole outwardly, as is the usual practice to brace the same.

The foregoing will, it is believed, suffice to impart a clear understanding of my invention without further explanation.

Manifestly, the invention, as described, is susceptible of further modification without departing from the inventive concept, and right is herein reserved to such other modifications as fall within the scope of the appended claim.

What I claim is:

Guy line equipment for a tent top attached at the edge thereof to a side pole comprising a thimble link adapted to be linked in said edge, a pair of stakes adapted to be fixed in the ground one adjacent said pole and the other remote from the first one, a guy line attached intermediate the ends thereof to the remote stake to provide two stretches, one of said stretches extending through said thimble link, a terminal shackle on said one stretch, said other stretch being trained through said shackle and down to the first-mentioned stake and secured thereto.

OWEN E. MAHAFFEY.